United States Patent
Lafleur et al.

(10) Patent No.: US 9,616,581 B1
(45) Date of Patent: Apr. 11, 2017

(54) PRECISELY CONTROLLABLE GRIPPER ASSEMBLY FOR LOW FORCE APPLICATIONS

(71) Applicant: AIRPOT CORPORATION, Norwalk, CT (US)

(72) Inventors: Kenneth J. Lafleur, Norwalk, CT (US); Thomas C. Lee, Southbury, CT (US)

(73) Assignee: AIRPOT CORPORATION, Norwalk, CT (US)

( * ) Notice: Subject to any disclaimer, the term of this patent is extended or adjusted under 35 U.S.C. 154(b) by 0 days.

(21) Appl. No.: 15/057,602

(22) Filed: Mar. 1, 2016

(51) Int. Cl.
*B25J 15/02* (2006.01)
*B25J 15/08* (2006.01)

(52) U.S. Cl.
CPC ......... *B25J 15/0286* (2013.01); *B25J 15/086* (2013.01); *Y10S 901/37* (2013.01)

(58) Field of Classification Search
CPC .. B25J 15/0253; B25J 15/0286; B25J 15/086; B25B 5/061; Y10S 901/37
USPC .............................................. 294/207, 119.1
See application file for complete search history.

(56) References Cited

U.S. PATENT DOCUMENTS

| | | | | |
|---|---|---|---|---|
| 4,336,926 A * | 6/1982 | Inagaki | ................ | B25J 15/0286 269/218 |
| 4,730,862 A * | 3/1988 | Caen | ...................... | B25J 13/082 294/207 |
| 4,865,301 A * | 9/1989 | Ise | ........................ | B25J 15/0253 269/34 |
| 5,529,359 A * | 6/1996 | Borcea | ................. | B25J 15/0253 294/119.1 |
| 6,224,123 B1 * | 5/2001 | Ubele | .................. | B25J 15/0253 294/119.1 |
| 6,523,875 B1 * | 2/2003 | Ostholt | ............... | B25J 15/0253 294/119.1 |
| 6,598,918 B1 * | 7/2003 | Null | ..................... | B25J 15/0253 294/119.1 |
| 6,938,938 B2 * | 9/2005 | Risle | .................... | B25J 15/0253 294/119.1 |
| 7,258,378 B2 * | 8/2007 | Bellandi | ................. | B25B 5/061 294/119.1 |
| 8,668,423 B2 * | 3/2014 | Motonaga | ............ | B25J 15/0253 29/468 |
| 8,894,118 B2 * | 11/2014 | Null | ..................... | B25J 15/0293 294/119.1 |

* cited by examiner

*Primary Examiner* — Dean Kramer
(74) *Attorney, Agent, or Firm* — Epstein Drangel LLP; Robert L. Epstein

(57) ABSTRACT

The gripper assembly includes a base, a guide situated on the base, and first and second jaws members. First and second ball bearing slides are associated with the jaw members for mounting the jaw members for movement along a guide track between proximate and remote positions. First and second low friction pneumatic actuators are provided. A mechanical linkage connects the actuators to at least one of the jaw members. A pulley and wire rope assembly connects the first and second jaw members for simultaneous movement in opposite directions. Valves are provided for actuating one actuator at a time. Actuation of the first actuator causes simultaneous movement of the jaw members in one direction. Actuation of the second actuator causes simultaneous movement of the jaw members in opposite directions.

28 Claims, 5 Drawing Sheets

PRECISELY CONTROLLABLE GRIPPER ASSEMBLY FOR LOW FORCE APPLICATIONS

BACKGROUND OF THE INVENTION

1. Field of the Invention

The present invention relates to grippers and more particularly a gripper having dual pneumatic actuators design to hold delicate parts.

2. Description of Prior Art Including Information Disclosed Under 37 CFR 1.97 and 1.98

A gripper assembly is a mechanical device used to hold or clamp a workpiece. Grippers are used in many different applications in which a workpiece must be machined, assembled with other parts, tested, packaged, transported or handled in some manner. Grippers often include opposing jaw members or similar parts which can be moved along one or more guides on the surface of a base.

The jaw members are moved toward and away from each other. The jaw members are moved toward each other to hold a workpiece in a secure manner such that it can be worked on. The jaw members are moved away from each other to release the workpiece after work on the workpiece has been completed.

The jaw members may be moved by a variety of different type actuators which are mechanically coupled to the jaw members. The actuators can be electrically driven, such as a motor. The actuators can also be fluid driven, for example a hydraulic or pneumatic cylinder with an internal piston. The actuators can be coupled to the jaw members using various types of mechanical linkages, depending upon the type of actuator. Electrically driven actuators can be coupled to the jaw members by rack and pinion type assemblies. Fluid driven actuators can be connected to the jaw members by linkage elements, by a flexible filament, cable or rope.

Some grippers use a single actuator, such as a reversible motor to move the jaw members toward or away from each other. Other grippers use a fluid driven actuator and a spring combination where the spring is compressed as the jaw members are moved in one direction as the actuator is energized and the spring causes the jaw members to move in the reverse direction when the actuator is de-energized. Also known is the use of opposing fluid driven actuators to move the jaw members independently at different speeds and/or under different forces if the fluid driven actuators are not properly balanced.

The selection of a particular type of actuator and of the configuration of the mechanical link coupling the actuator to the jaw member determines the characteristics of the gripper assembly and is often dictated by the particular type of workpiece that the gripper assembly is designed to be used with and the particular kinds of operations being performed on the workpiece as it is clamped in the gripper assembly.

In cases where it is desired to have the jaw members close at the same speed and/or exert the same amount of force, a synchronizing mechanism may be incorporated into the linkage between the actuator and the jaw member. The configuration of the synchronizing mechanism depends upon the type of actuator selected and the result that the gripper assembly is designed to achieve.

For example, U.S. Pat. No. 8,905,452 issued Dec. 9, 2014 to Williams discloses a rack and pinion linkage as a force-multiplying mechanism to connect an electric motor to the jaw members. U.S. Pat. No. 6,598,918 issued Jul. 29, 2003 to Null discloses a gripper with a synchronizing mechanism which controls the speed of the jaw members as well as the force applied by the jaw members.

However, one of the problems inherent in conventional gripper assemblies is that they cannot be used effectively to retain delicate workpieces such as computer chips and fragile parts made of glass. This is in large part because friction prevents conventional grippers from being controlled precisely enough to apply very low force to the workpiece and at the same time clamp the workpiece firmly enough to prevent movement of the workpiece as it is being worked on.

BRIEF SUMMARY OF THE INVENTION

It is, therefore, a prime object of the present invention to provide a precisely controlled gripper assembly for low force applications.

It is another object of the present invention to provide a precisely controlled gripper assembly for low force applications designed for use with delicate parts.

It is another object of the present invention to provide a precisely controlled gripper assembly for low force applications which includes two very low friction actuators.

It is another object of the present invention to provide a precisely controlled gripper assembly for low force applications wherein the actuators are pneumatically driven It is another object of the present invention to provide a precisely controlled gripper assembly for low force applications wherein the actuators are independently driven.

It is another object of the present invention to provide a precisely controlled gripper assembly for low force applications wherein the actuators are driven in opposite directions.

It is another object of the present invention to provide a precisely controlled gripper assembly for low force applications wherein the jaw members move along a common guide rail.

It is another object of the present invention to provide a precisely controlled gripper assembly for low force applications wherein the jaw members move along the guide rail on ball bearing slides.

It is another object of the present invention to provide a precisely controlled gripper assembly for low force applications wherein the actuators are coupled to the jaw members by a wire rope and pulley assembly.

It is another object of the present invention to provide a precisely controlled gripper assembly for low force applications wherein the coupling assembly includes a wire rope loop extending between spaced pulleys.

It is another object of the present invention to provide a precisely controlled gripper assembly for low force applications wherein each jaw member is connected to the coupling assembly wire rope at a different point on the loop.

It is another object of the present invention to provide a precisely controlled gripper assembly for low force applications in which the mechanical linkage coupling the actuators to the jaw members includes a flexible joint to compensate for misalignment.

It is another object of the present invention to provide a precisely controlled gripper assembly for low force applications where the jaw members are situated within a recess defined by an interior wall including a stop mechanism associated with the jaw members which prevents the jaw members from contacting the wall as the jaw member approach their remote position It is another object of the present invention to provide a precisely controlled gripper assembly for low force applications formed of simple mechanical parts which co-operate together for a long, useful life.

It is another object of the present invention to provide a precisely controlled gripper assembly for low force applications formed of relatively inexpensive, easily assembled parts.

The above objects are achieved by the present invention which relates to a gripper assembly for clamping a workpiece. The assembly includes a base, a guide situated on the base, and first and second jaws members mounted for movement along the guide between proximate and remote positions. First and second pneumatic actuators are provided as are means for connecting said first and second actuators to at least one of the first and second jaw members. Means are provided for connecting the first and second jaw members for simultaneous movement in opposite directions. Means are also provided for independently actuating each of the first and second actuators such that actuation of the first actuator causes simultaneous movement of the jaw members in one direction and the actuation of the second actuator causes simultaneous movement of the jaw members in a different direction.

The assembly includes a ball bearing slide upon which at least one of the jaw members is mounted for movement along the guide.

The jaw member connecting means includes first and second spaced pulleys and a wire rope loop extending between the pulleys. The first and second pulleys are independently mounted for rotational movement relative to the base. The wire rope loop is located in a plane substantially parallel to the plane of the guide.

The actuator connecting means further includes a mechanical linkage for connecting the first actuator and the second actuator to the first jaw member.

The assembly also includes means for connecting the mechanical linkage to the wire rope loop and means for connecting the second jaw member to the wire rope loop. The first and second jaw members are connected at different locations on the wire rope loop.

The first and second actuators are very low friction, pneumatically driven actuators. The actuators each include a cylinder with an interior glass surface and a piston. Air under pressure surrounds the piston and functions as a partial air bearing.

The actuators include a piston with a flexible piston rod. The mechanical linkage includes a flexure joint formed by the flexible piston rod.

A stop mechanism is provided to prevent the jaw members from contacting the interior wall of the base recess within which they are situated as the jaw members approach the remote position.

The actuator actuating means includes a source of pressurized air and a valve connecting either the first actuator or the second actuator to the pressurized air source.

In accordance with another aspect of the present invention, a low force gripper assembly is provided for clamping a delicate workpiece. The assembly includes a base, a guide situated on the base, and first and second jaws members. First and second ball bearing slide means associated with the jaw members are provided for mounting the jaw members for movement along the guide between proximate and remote positions. First and second low friction pneumatic actuators are provided as is a mechanical linkage connecting each of the first and second actuators to at least one of the first and second jaw members. A pulley and wire rope assembly connects the first and second jaw members for simultaneous movement in opposite directions. Valve means are provided for actuating the first and second actuators one at a time such that actuation of the first actuator causes simultaneous movement of the jaw members in one direction and the actuation of the second actuator causes simultaneous movement of the jaw members in the opposite direction.

The pulley and wire rope assembly includes first and second spaced pulleys and a wire rope loop extending between the pulleys. The first and second pulleys are independently mounted for rotational movement relative to the base. The wire rope loop is located in a plane substantially parallel to the plane of the guide.

The assembly further includes means for connecting the mechanical linkage to the wire rope loop and means for connecting the other jaw member to the wire rope loop. The first and second jaw members are connected to the wire rope loop at different locations.

Each of the actuators includes a cylinder with an interior glass surface and a piston, in which air under pressure surrounds the piston and functions as a partial air bearing.

Each actuator includes a flexible piston rod connected to the mechanical linkage to form a flexure joint.

A stop mechanism is provided to prevent the jaw members from contacting the interior wall of the base recess within which they are situated as the jaw members approach the remote position.

BRIEF DESCRIPTION OF THE SEVERAL VIEWS OF DRAWINGS

To these and to such other objects that may hereinafter appears, the present invention relates to a precisely controllable gripper assembly for low force applications as described in detail in the following specification and recited in the annexed claims, taken together with the accompanying drawings, in which like numerals refer to like parts and in which:

DETAILED DESCRIPTION OF THE INVENTION

Figure 1:
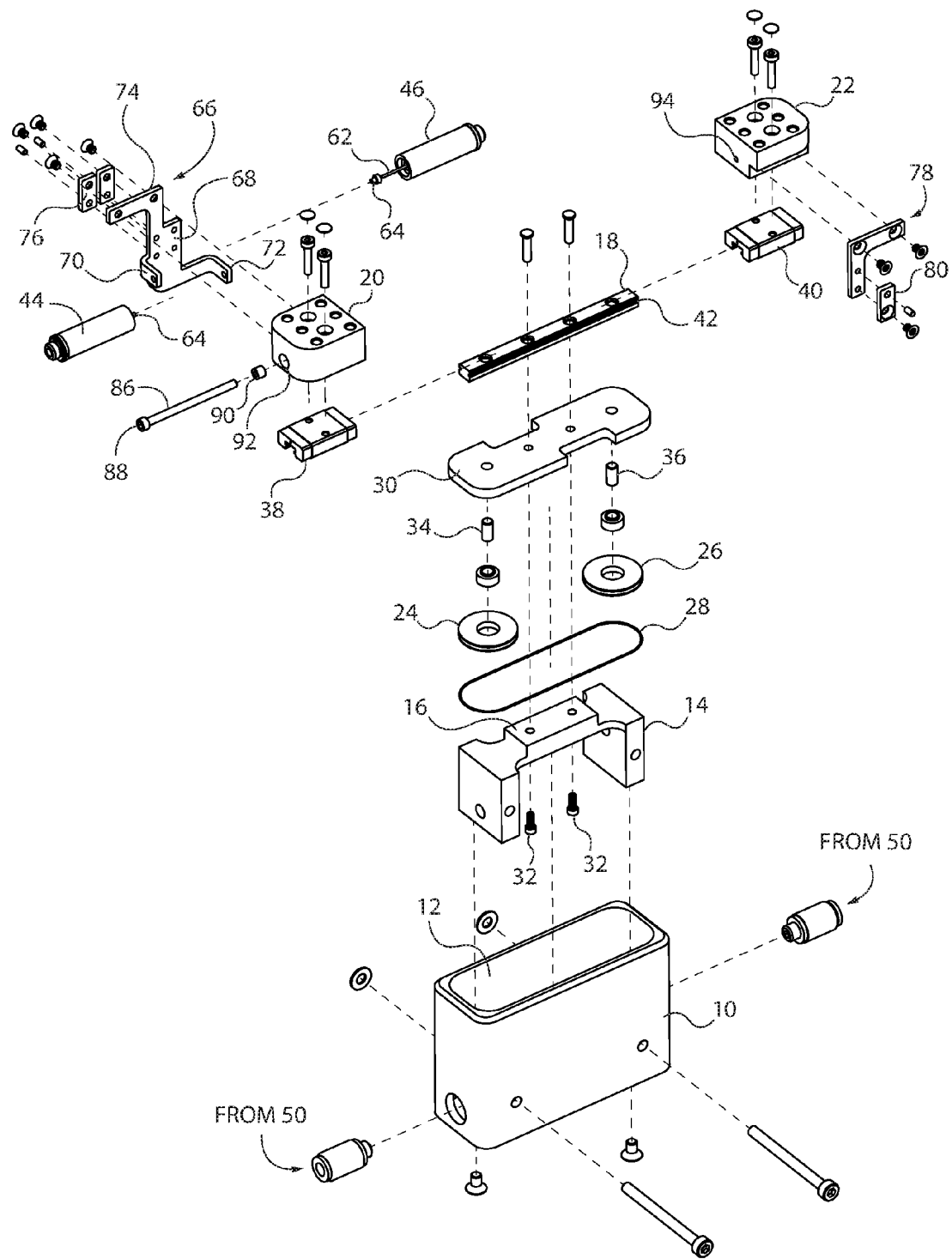
FIG. 1 is an exploded view of the components of the gripper assembly of the present invention.
Figure 5A:
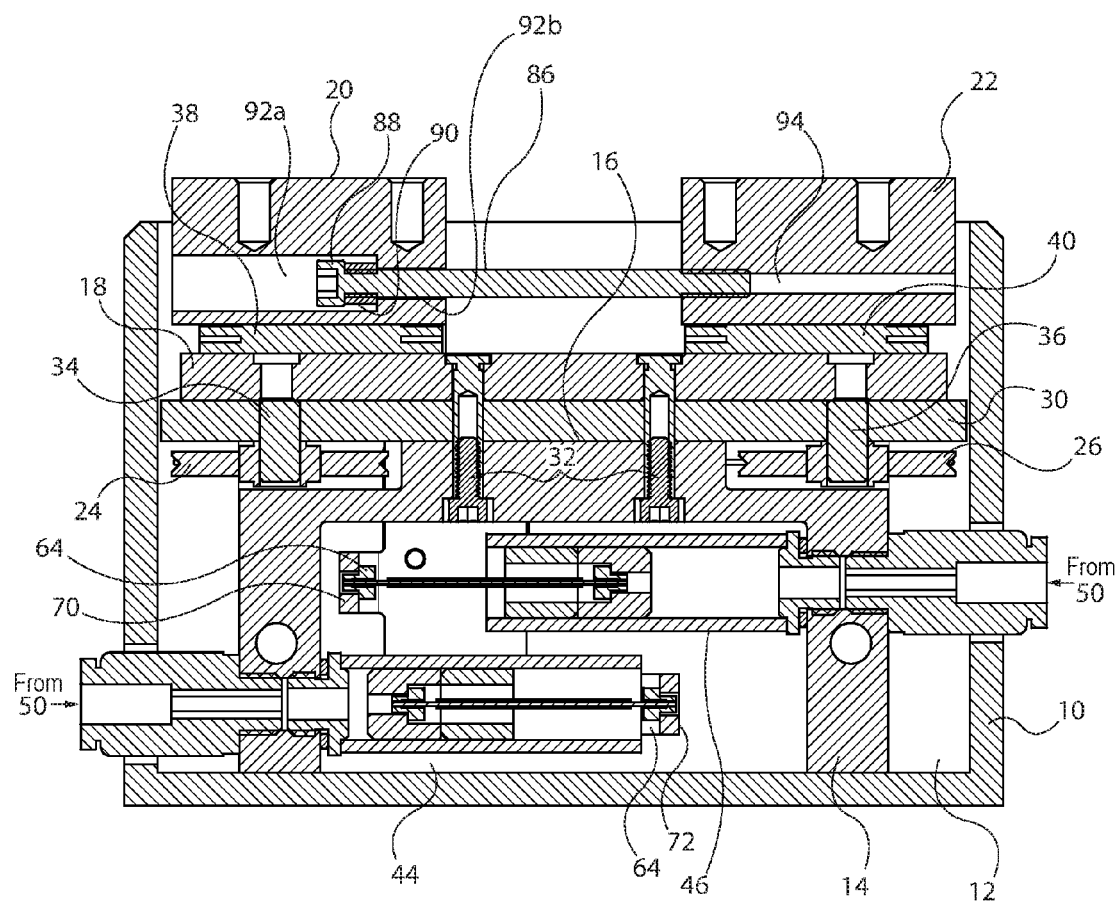
FIG. 5A is a cross section view if the gripper assembly along line 5A of FIG. 4 with the Jaw members in the remote position.
Figure 5B:
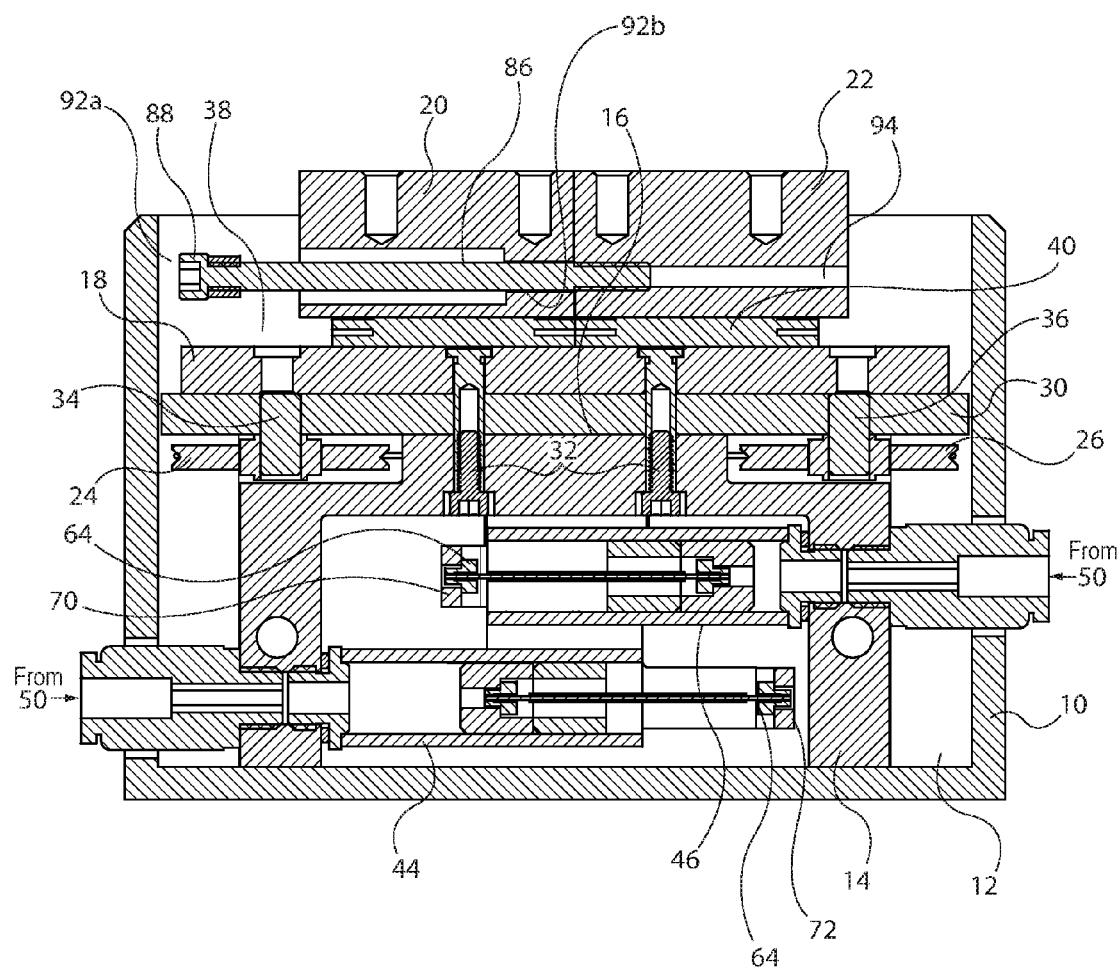
FIG. 5B is a cross section view if the gripper assembly along line 5A of FIG. 4 with the Jaw members in the proximate position.

As seen in the FIG. 1, which shows the gripper assembly with the parts exploded, and FIGS. 5A and 5B, which show gripper assembly in cross section, the gripper assembly of the present invention includes a base 10 defining a recess 12 within which the other components of the assembly are received, including a member 14 with a top portion 16 which divides recess 12 into upper and lower portions.

Top portion 16 of member 14 functions as a platform for a track 18. Track 18 serves as a guide for the movement of jaw members 20 and 22. Member 14 also supports first and second pulleys 24, 26. Along with pulleys 24, 26, a continuous loop of wire rope 28 extending between the pulleys forms a means for connecting the jaw members for simultaneous movement in opposite directions.

Track 18 is secured to the upper surface of an elongated part 30 which in turn is fastened to the planar middle portion of surface 16 by screws 32. Pulleys 24, 26 are suspended from the bottom surface of member 30 for rotation about shafts 34, 36.

Jaw members 20 and 22 are mounted for movement along guide track 18 between proximate and remote positions in a low friction manner. Each jaw member 20, 22 is fastened to the top of a slide 38, 40. Each of the slides 38, 40 has a generally upside down "U" shape. The interior surface of each of the downwardly extending sides of each slide are provided with a series of ball bearings which extend into channels 42 on the exterior surface of each of the sides of guide track 18. This ball bearing connection between the slides 38, 40 and the track 18 permits the jaw members connected to the slides to move along a guide track with a minimum of friction.

First and second low friction pneumatic actuators 44, 46 are provided to move the jaw members. The actuators are actuated by compressed air from a pressurized air source 48, which may be a tank of pressurized air or a compressor.

Figure 3:
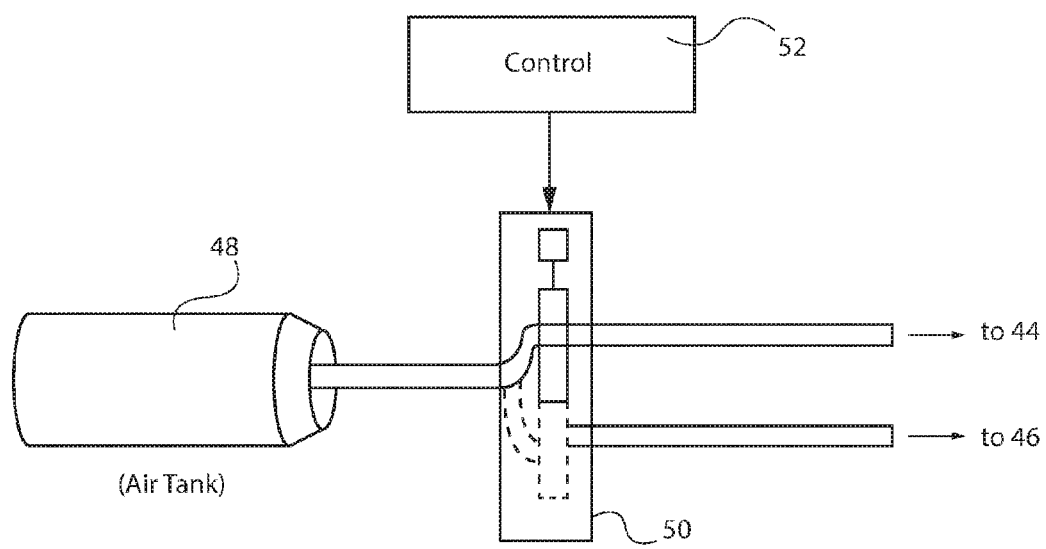
FIG. 3 is a schematic diagram of the air control system.
Figure 4:
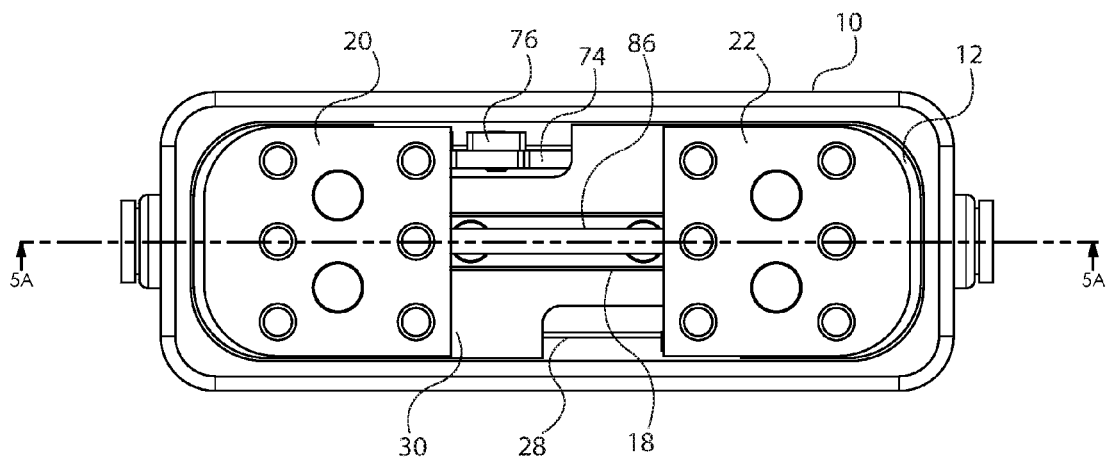
FIG. 4 is a plan view showing the top of the gripper assembly.

As seen in FIG. 3, source 48 is connected to the entrance port of a valve 50. Valve 50 has two exit ports, one of which is connected to actuator 44 and the other of which is connected to actuator 46. Valve 50 may be any conventional valve capable of connecting source 48 to a selected one of the actuators 44, 46 in accordance with a command signal from the gripper control 52.

Valve 50 may have an internal slide part with a single channel which is moved between two positions by a solenoid controlled by the command signal. In one position, the air supply is connected to actuator 44. In the second position, the air supply is connected to actuator 46. The air supply is never connected to both actuators at the same time.

Figure 2:
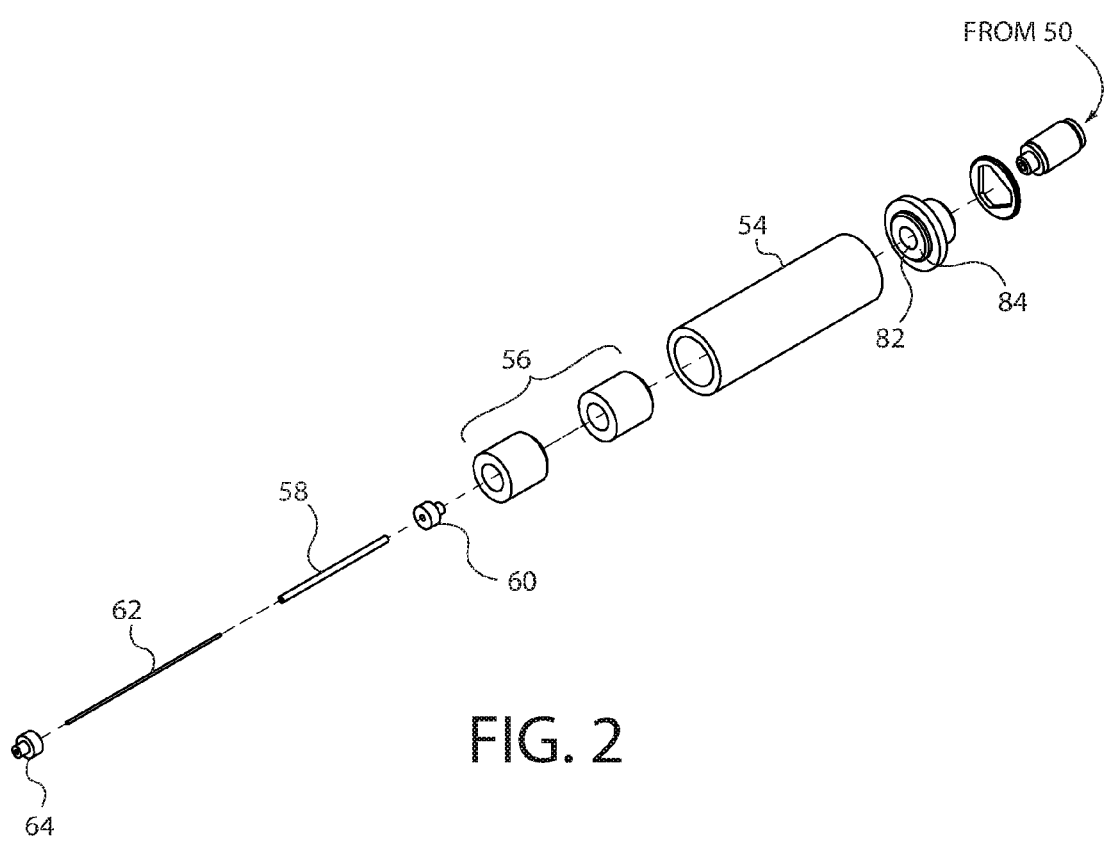
FIG. 2 is an exploded view of one of the pneumatic actuators which form a part of the gripper assembly.

Actuators 44 and 46 are located within recess 12 of base 10 below member 14. As seen in FIG. 2, each actuator includes a hollow, glass cylinder 54 within which a graphite piston 56 is located. Each piston 56 has a piston rod 58 which extends outwardly from a connector 60 which is received in a central opening in the front of the piston. Each piston rod has a flexible wire portion 62 which forms a flexible joint with the part to which it is connected. The flexible rod accommodates misalignment due to manufacturing variations in order to reduce piston side loading, resulting in lower friction.

A connector 64 is fastened to the end of flexible wire portion 62 of each actuator. The connector 64 each actuator is attached to a mechanical linkage generally designated 66. Linkage 66 has a metal planar body 68 with first and second spaced perpendicular arms 70, 72 each having an opening. The openings in the arms 70, 72 are adapted to receive the connectors 64 of the piston rods of actuators 44 and 46, respectively. Because wire portion 62 of the piston rods can flex, any misalignment between the actuator and the linkage due to wear is automatically compensated.

Linkage body 68 also has a portion 74 at the top which is adapted to be fixed to wire rope 28 which is captured between portion 74 and bracket 76. A right angle bracket 78 attached to jaw member 22 cooperates with part 80 to fix jaw member 22 to wire rope 28. Jaw members 20, 22 are fixed to different locations along wire rope 28 such that the jaw members move simultaneously in opposite directions. Thus, when one actuator is actuated by connection to the pressurized air supply, the jaw members will move in one direction to a position proximate each other to clamp a workpiece. When the other actuator is connected to the pressurized air source, the jaw members will move in the opposite direction, toward a position remote from each other, releasing the workpiece.

As is best seen in FIG. 2, the rear wall of the actuator, which is connected to air supply 48 through valve 50, has a central opening 82 surrounded by a ring-like member 84 which acts as a stop to define the extreme end of the path of travel of the piston.

The gripper assembly is provided with a stop mechanism which prevents jaw members 20 and 22 from contacting the interior wall of base 10 which defines recess 12 as the jaw members approach the remote position, as best seen in FIG. 5A. The stop mechanism includes a screw 86 with an enlarged screw head 88 and a urethane tube section which acts as a bumper 90. Bumper 90 is received on screw 86 at a position adjacent screw head 88. Screw 86 extends through a bore 92 in jaw 20 with the end of the screw extending into a bore 94 in jaw member 22. FIG. 2 shows an exploded view of these parts.

The cross-sectional view of the gripper in FIG. 5A shows that bore 92 in jaw member 20 includes a larger diameter portion 92a within which the head 88 of screw 86 and the adjacent bumper 90 are received. The body of screw 86 extends through the smaller diameter bore portion 92b in jaw member 20 with the externally threaded end of the screw engaged by the internal threads of the bore 94 of jaw member 22.

When the jaw members 20 and 22 are in the proximate position as seen in FIG. 5B, the screw head 88 of screw 86 is situated toward the left hand end of bore portion 92a. As the jaw members move toward the remote position, as seen in FIG. 5A, the screw head 88 moves toward the right hand end of bore section 92a. As the jaw members approach the remote position, bumper 90, which is situated between screw head 88 and the wall which defines the right hand end of bore portion 92a, acts to stop the screw head from moving further, This defines the extreme remote position of the jaw member.

By rotating screw 86 to alter the extent that the end thereof is received in bore 94 of jaw member 22, the extreme remote position of the jaw members can be defined such that the jaw members do not come into contact with the interior wall of base recess 12 in the remote position. Bumper 90 acts to cushion the impact between the screw head 88 and the wall of bore portion 92a such that the jaw members do not impact the base as the jaw members approach the remote position.

It should be noted that the preferred embodiment described above is configured with single acting actuators where pressurize air is supplied to one side of the piston to move the piston in one direction. Accordingly, the jaw members act with the same force in both directions. However, it is well within the skill of one of ordinary skill in the art to replace the single acting actuators with double acting actuators such that the jaw members apply different force in each direction.

It will now be understood that the present invention relates to a low force, low friction gripper assembly for clamping a delicate workpiece including a base, a guide situated on the base, and first and second jaws members. First and second ball bearing slides are associated with the jaw members for mounting the jaw members for movement along the guide between proximate and remote positions. First and second low friction pneumatic actuators are provided. A mechanical linkage is provided for connecting each of the actuators to at least one of the jaw members. A pulley and wire rope assembly connects the first and second jaw members for simultaneous movement in opposite directions, between a remote position as illustrated in FIG. 5A and a proximate position as seen in FIG. 5B. Valve means are provided for actuating the first and second actuators one at a time such that actuation of the first actuator causes simultaneous movement of the jaw members in one direction and the actuation of the second actuator causes simultaneous movement of the jaw members in a different direction.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

We claim:

1. A gripper assembly for clamping a workpiece comprising a base, a guide situated on said base, first and second jaws members mounted for movement along said guide between proximate and remote positions, first and second pneumatic actuators, means for connecting said first and second actuators to at least one of said first and second jaw members, means for connecting said first and second jaw members for simultaneous movement in opposite directions, and means for independently actuating each of said first and second actuators such that actuation of said first actuator causes simultaneous movement of said jaw members in one direction and the actuation of said second actuator causes simultaneous movement of said jaw members in opposite directions, wherein each of said first and second actuators is very low friction, pneumatically driven actuator and wherein at least one of said actuators includes a cylinder with an interior glass surface and a piston, in which air under pressure surrounds said piston and functions as a partial air bearing.

2. The assembly of claim 1 wherein said jaw member connecting means comprises first and second spaced pulleys and a wire rope loop extending between said pulleys.

3. The assembly of claim 2 wherein said first and second pulleys are independently mounted for rotational movement relative to said base.

4. The assembly of claim 2 wherein said wire rope loop is located in a plane substantially parallel to the plane of said guide.

5. The assembly of claim 2 wherein said actuator connecting means further comprises a mechanical linkage for connecting said actuators and said at least one jaw member.

6. The assembly of claim 5 further comprising means for connecting said mechanical linkage to said wire rope loop.

7. The assembly of claim 6 further comprising means for connecting said other jaw member to said wire rope loop.

8. The assembly of claim 7 wherein said first and second jaw members are connected to said wire rope loop at different locations.

9. The assembly of claim 1 wherein said actuator actuating means comprises a valve.

10. A gripper assembly for clamping a workpiece comprising a base, a guide situated on said base, first and second jaws members mounted for movement along said guide between proximate and remote positions, first and second pneumatic actuators, means for connecting said first and second actuators to at least one of said first and second jaw members, means for connecting said first and second jaw members for simultaneous movement in opposite directions, and means for independently actuating each of said first and second actuators such that actuation of said first actuator causes simultaneous movement of said jaw members in one direction and the actuation of said second actuator causes simultaneous movement of said jaw members in opposite directions, wherein said jaw member connecting means comprises first and second spaced pulleys and a wire rope loop extending between said pulleys, wherein said actuator connecting means further comprises a mechanical linkage for connecting said actuators and said at least one jaw member, and wherein at least one of said actuators comprises a piston with a flexible piston rod forming a flexure joint with the mechanical linkage.

11. The assembly of claim 10 further comprising a ball bearing slide upon which at least one of said jaw members is mounted for movement along said guide.

12. The assembly of claim 10 wherein each of said first and second actuators is very low friction, pneumatically driven actuator.

13. The assembly of claim 10 further comprising stop means for defining said remote position of said jaw members.

14. A gripper assembly for clamping a workpiece comprising a base, a guide situated on said base, first and second jaws members mounted for movement along said guide between proximate and remote positions, first and second pneumatic actuators, means for connecting said first and second actuators to at least one of said first and second jaw members, means for connecting said first and second jaw members for simultaneous movement in opposite directions, and means for independently actuating each of said first and second actuators such that actuation of said first actuator causes simultaneous movement of said jaw members in one direction and the actuation of said second actuator causes simultaneous movement of said jaw members in opposite directions, further comprising stop means for defining said remote position of said jaw members, wherein said stop means comprises a screw comprising a screw head and an end, said screw head being slideably received within a bore in one of said jaw members with said end received in said other jaw member.

15. The assembly of claim 14 further comprising a bumper member situated between said screw head and the end of said bore.

16. A low force gripper assembly for clamping a delicate workpiece comprising a base, a guide situated on said base, first and second jaws members, first and second ball bearing slide means associated with said jaw members for mounting said jaw members for movement along said guide between proximate and remote positions, first and second low friction pneumatic actuators, a mechanical linkage connecting each of said first and second actuators to at least one of said first and second jaw members, a pulley and wire rope assembly connecting said first and second jaw members for simultaneous movement in opposite directions, and valve means for actuating said first and second actuators one at a time such that actuation of said first actuator causes simultaneous movement of said jaw members in one direction and the actuation of said second actuator causes simultaneous movement of said jaw members in opposite directions.

17. The assembly of claim 16 wherein said pulley and wire rope assembly comprises first and second spaced pulleys and a wire rope loop extending between said pulleys.

18. The assembly of claim 17 wherein said first and second pulleys are independently mounted for rotational movement relative to said base.

19. The assembly of claim 17 wherein said wire rope loop is located in a plane substantially parallel to the plane of said guide.

20. The assembly of claim 17 further comprising means for connecting said mechanical linkage to said wire rope loop.

21. The assembly of claim 20 further comprising means for connecting said other jaw member to said wire rope loop.

22. The assembly of claim 17 wherein said mechanical linkage and said other jaw member are connected at different locations on said wire rope loop.

23. The assembly of claim 16 wherein at least one of said actuators includes a cylinder with an interior glass surface and a piston, in which air under pressure surrounds said piston and functions as a partial air bearing.

24. The assembly of claim 16 wherein at least one of said actuators comprises a piston with a flexible piston rod forming a flexure joint with the associated mechanical linkage.

25. The assembly of claim 16 wherein at least one of said actuators comprises a stop member which determines said remote position of the jaw member associated with that actuator.

26. The assembly of claim 16 further comprising stop means for defining said remote position of said jaw members.

27. The assembly of claim 26 wherein said stop means comprises a screw comprising a screw head and an end, said screw head being slideably received within a bore in one of said jaw members with said end received in said other jaw member.

28. The assembly of claim 27 further comprising a bumper member situated between said screw head and the end of said bore.

* * * * *